(12) United States Patent
Vetsch

(10) Patent No.: US 7,945,422 B2
(45) Date of Patent: May 17, 2011

(54) TIRE PRESSURE AUGMENTED AIRCRAFT WEIGHT AND BALANCE SYSTEM AND METHOD

(75) Inventor: LeRoy E. Vetsch, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 86 days.

(21) Appl. No.: 12/355,561

(22) Filed: Jan. 16, 2009

(65) Prior Publication Data

US 2010/0185413 A1 Jul. 22, 2010

(51) Int. Cl.
*G01G 9/00* (2006.01)
*G01G 23/00* (2006.01)
(52) U.S. Cl. .................. 702/173; 701/3; 701/29
(58) Field of Classification Search .......... 702/101, 702/173, 174; 73/65.05, 146, 165, 767; 701/29, 701/124, 3; 177/146; 340/443; 244/26, 244/50, 100 R, 104 FP, 119
See application file for complete search history.

(56) References Cited

U.S. PATENT DOCUMENTS

| | | | |
|---|---|---|---|
| 3,581,836 A | 6/1971 | Segerdahl et al. | |
| 3,802,523 A | 4/1974 | Clark | |
| 4,463,428 A | 7/1984 | Gilliam | |
| 4,866,419 A | 9/1989 | Kyrtsos et al. | |
| 5,548,517 A | 8/1996 | Nance | |
| 6,415,242 B1 | 7/2002 | Weldon, Jr. et al. | |
| 7,281,418 B2 | 10/2007 | Mardirossian | |
| 2006/0144997 A1 | 7/2006 | Schmidt et al. | |
| 2008/0033607 A1* | 2/2008 | Zeliff et al. | 701/29 |
| 2008/0119967 A1 | 5/2008 | Long et al. | |

FOREIGN PATENT DOCUMENTS

FR 2097395 3/1972

OTHER PUBLICATIONS

European Patent Office, "European Search Report", Apr. 21, 2010, Published in: EP.

* cited by examiner

*Primary Examiner* — John H Le
(74) *Attorney, Agent, or Firm* — Fogg & Powers LLC

(57) ABSTRACT

A weight and balance system for accurately determining gross weight of an aircraft. The present invention integrates tire pressure measurements with strut pressure measurements to overcome the problem associated with the friction in the strut seals, and simultaneously overcome the problem with the large number of variables associated with using tire pressure measurement to determine load (weight on wheels). An example system includes a plurality of strut pressure sensors that generate strut pressure data for landing gear struts of the aircraft and a plurality of tire pressure sensors that generate tire pressure data for tires of the aircraft. A processing device that is in data communication with the strut and tire pressure sensors determines gross weight and center of gravity of the aircraft based on the received strut and tire pressure data.

20 Claims, 2 Drawing Sheets

TIRE PRESSURE AUGMENTED AIRCRAFT WEIGHT AND BALANCE SYSTEM AND METHOD

BACKGROUND OF THE INVENTION

Modern aircraft are equipped with a generous assortment of sensors and instrumentation to facilitate operation of the aircraft. Nearly every parameter critical to safe and efficient operation is accurately monitored in real time, with one notable exception. The gross weight and longitudinal center of gravity, both critical to safe and efficient operation, are based on a variety of inputs, which include a mixture of predetermined "known" values, measured values, and estimates based on statistical sampling. The Load and Trim Sheet, or Manifest, is the outcome of the load planning process that utilizes these inputs. Although the load planning process is highly controlled, there are opportunities for undetected errors. In addition, even if the load plan is perfect, the actual loading process can introduce errors that cannot be detected without a real time measurement of the "as loaded condition" of the aircraft. Furthermore, during the loading process the aft section can become disproportionately heavy (due to early aft loading of cargo and/or baggage) resulting in the aircraft tipping (tail down), which can cause damage to the fuselage.

According to the National Aerospace Laboratory Report Number NLR-TP-2007-153, the majority (more than 90%) of weight and balance problems identified could be eliminated if there was a system available to the flight crew that would do an automatic onboard weight and balance assessment.

Present on-board aircraft weight and balance systems (WBS) that measure strain in the landing gear structure, require a multitude of precision sensors (usually one or more per wheel location) historically resulting in a system that is expensive and impractical for smaller lower cost aircraft. In addition, these systems require features in the landing, or special "add-on" adapters to facilitate the attachment of the sensors to the landing gear structure, making retrofit of these systems either expensive or impractical. Therefore, only the very high value large wide body aircraft currently utilize these systems.

There are also several prior art versions of on-board WBS that utilize strut pressure measurements to determine the weight supported by each "leg" (strut) of the aircraft. This is an appealing concept because it only requires one pressure sensor for each landing gear strut (the load is ideally just the pressure times the piston area) and these sensors can be attached to existing servicing ports. However, these systems were historically inaccurate due to the high static friction or "stiction" associated with the seals between the moving strut piston and the outer cylinder that contains the strut gas or liquid (or both). To overcome this static friction a number of creative methods have been employed. These include a system of pumps and valves and/or heaters and valves used to modulate the pressure within the strut until the static friction is overcome. Using "smart algorithms" these approaches have been shown to significantly improve the accuracy of the system, however, they also tend to add weight and complexity to the system as well as inducing additional complex failure mechanisms.

Another potential approach to on-board WBS is to measure the tire pressure and calculate the change in the weight support by each tire as a function of the change in the tire pressure. This approach is appealing because tire pressure measurement systems are already in use on many aircraft (though not for this purpose). There are two fundamental problems with this approach; first of all, the current tire pressure measurement systems are not precise enough; and secondly, tire pressure can vary greatly between tires and with differing environmental conditions for the same applied load (weight supported by the tire). With regard to measurement precision, because tire pressure is only a secondary function of the load supported by the tire, it only changes about 5% for a fully loaded aircraft (most of the change in load results in a change in the tire footprint area and not a change in the tire pressure). For this reason the pressure measurement must be very sensitive (5% of pressure equals 100% of load, so 1% of load equals approximately 0.05% of pressure). For large aircraft tires this equates to a measurement accuracy of approximately 0.1 PSIG. This is achievable with current precision pressure sensors, but not those typically used for aircraft tire pressure only. Therefore, improved accuracy tire pressure sensors would generally be required.

With regard to environmental variables, the difference in normal tire servicing pressures (+/−5 PSIG) is almost equal to the full range of pressure change resulting from loading, and tire pressure can vary greatly over time due to temperature changes and small undetected leaks. In addition to these factors, the pressure per pound of load is also influenced by the tire characteristics (i.e., tread and sidewall stiffness, etc), and these can vary over the life of the tire. Although some of these variables can be characterized or monitored, the residual variations associated with using tire pressure to determine the load support by the tire are quite large (roughly the same magnitude as the total change in pressure due to loading), and tend to making this approach impractical if not impossible.

SUMMARY OF THE INVENTION

The present invention performs integrating tire pressure measurements with strut pressure measurements to overcome the problem associated with the friction in the strut seals, and simultaneously overcome the problem with the large number of variables associated with tire pressure measurement as a means of determining load (weight on wheels).

An example weight and balance system includes a plurality of strut pressure sensors that generate strut pressure data for landing gear struts of the aircraft and a plurality of tire pressure sensors that generate tire pressure data for tires of the aircraft. A processing device that is in data communication with the strut and tire pressure sensors determines the load carried by each strut, the total gross weight, and the center of gravity of the aircraft based on the received strut and tire pressure data. The processing device can also determine if, during the loading process, the aft section of the aircraft becomes disproportionately heavy (due to early aft loading of cargo and/or baggage), and can output an "Impending Tail Tip" warning. This warning can be use to halt the loading process and prevent the aircraft from tipping (tail down), which may otherwise result in damage to the fuselage.

In one aspect of the invention, the processing device determines if the struts are at a desired position based on a predefined pressure step change profile and adjusts the received tire pressure data with the strut pressure data, if it is determined the struts are at a desired position.

In another aspect of the invention, the processing device adjusts the received strut pressure data based on the tire pressure data, if it is determines that the struts are not at a desired position.

In another aspect of the invention, the processing device uses the received and adjusted load data (strut pressure data and/or the tire pressure data) to produce total gross weight and/or the center of gravity data.

In another aspect of the invention, the processing device performs temperature compensation of at least one of the strut pressure data and/or the tire pressure data prior to determining the weight and/or center of gravity based on received temperature information.

In another aspect of the invention, the processing device uses measured or received longitudinal fuselage pitch angle data to correct the center of gravity calculation.

In still another aspect of the invention, the processing device uses the received and adjusted load data (strut pressure data and/or the tire pressure data) to produce and output an impending tail tip warning signal.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
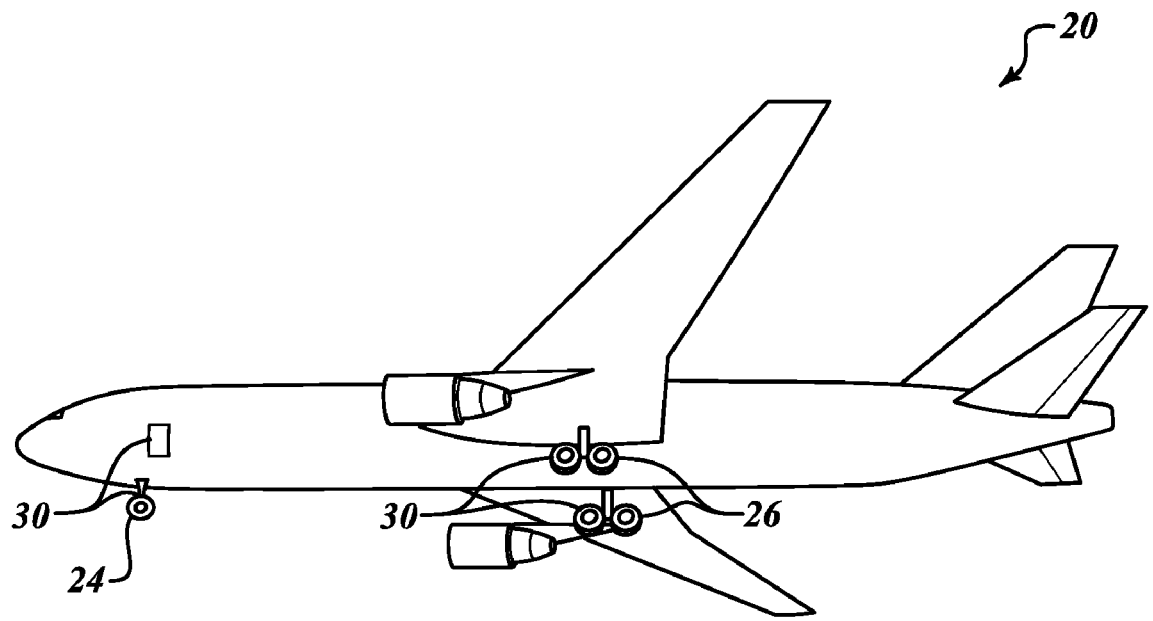
FIG. 1 is a perspective view of an aircraft having a weight balance system (WBS) formed in accordance with an embodiment of the present invention.

The present invention combines the strengths of these two approaches (strut pressure and tire pressure measurements), so as to overcome their individual weaknesses. A tire pressure measurement system, when equipped with precision sensors, can detect small changes in the applied load over a short period of time. However, it cannot accurately determine the absolute total load in the presence of so many variables without regular periodic recalibration and/or additional measurement inputs. On the other hand, a strut pressure measurement system is only accurate (that is the pressure is a true representation of the load) when there is no (or very little) static friction supporting the load on the strut. This condition is only valid for a brief instant after the strut piston has moved in response to a significant change in the load supported by the strut (or as the result of forcibly changing the pressure in the strut). In other words, for a continuously increasing (or decreasing) loading condition, the strut will move in steps, and therefore the indicated pressure measurement will also move in steps. The pressure measurement will not accurately represent the load, except during those brief periods just after the strut has moved and before significant additional load has been applied. However, the tire pressure will change continuously as the load is changing (to precisely correlate tire pressure to strut pressure all tires coupled to a given strut must be monitored, or a correlation must be established between the monitored tires and the strut tire set). As the load is increased (or decreased) the static friction will prevent the strut piston from moving (and there will be no measureable pressure change) until the applied load overcomes the static friction, and then the piston will move creating an increase (or decrease) in the pressure within the strut. When the pressure within the strut multiplied times the area of the piston is equal to the total applied load, the strut piston will stop moving, and for a brief moment the measured pressure will be a true representation of the applied load (within the dynamic limits of over-shoot and under-shoot). So, a strut pressure measurement system, even without adding pumps and valves, can make an accurate measurement of the supported load under certain limited conditions (i.e., immediately after the static friction has been overcome by changing the load). Therefore, it is possible to periodically make an accurate measurement of the load on the strut, without forcibly changing the pressure. This can be accomplished by monitoring the strut pressure, determining when the strut pressure measurement is accurate, and incrementally determining the magnitude of the change in the applied load (being consumed by the strut seal static friction) during those periods when the applied load is changing and the measured strut pressure is not.

The present invention accomplishes this by comparing the measured strut pressure to a secondary load measurement means (tire pressures) that is not subject to the strut seal friction error. The secondary load measurement need only be accurate enough to determine when the strut pressure is accurate (based on a step change in the strut pressure), and to determine the incremental change in load (either positive or negative) until the next pressure step change occurs. This can be accomplished by measuring the pressure in all tires associated with the strut, or by measuring a "representative sample" subset of all tires associated with the strut. One embodiment, described in the following paragraphs, measures the pressure in all tires of each strut. However, it will be understood that these techniques are equally valid if only a representative subset of tire pressures are measured.

As shown in FIG. 1, an embodiment of the present invention provides a cost effective Weight and Balance System (WBS) for an aircraft 20 that is suitable for both new production and retrofit applications. The present invention utilizes strut pressure measurements on landing gear (nose, main, etc.) 24 and 26 that are augmented by other measurements to overcome the problem associated with strut seal friction.

Figure 2:
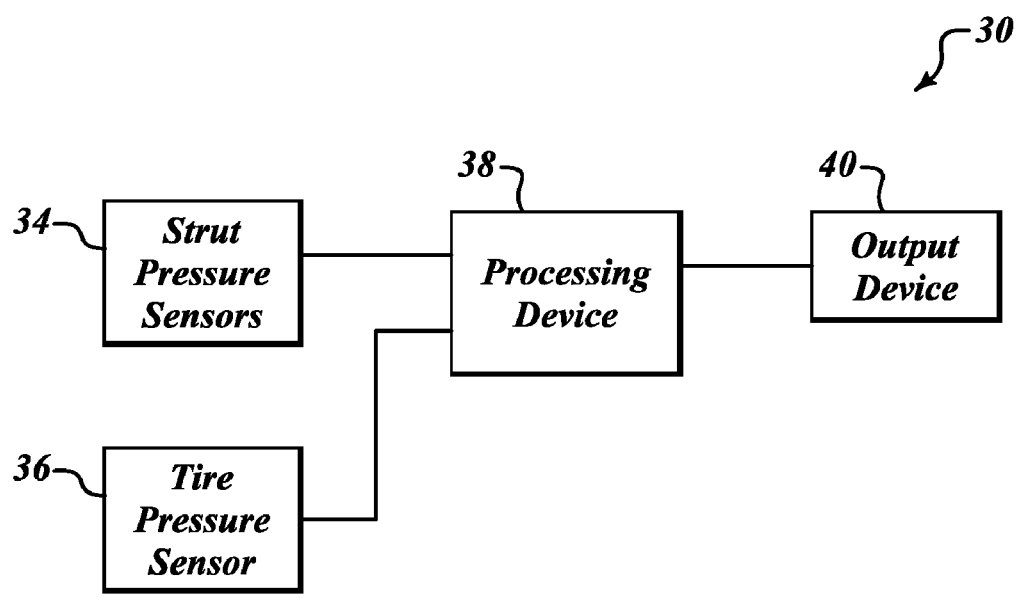
FIG. 2 is a block diagram of an example WBS used in the aircraft in FIG. 1.

In one embodiment, as shown in FIG. 2, a WBS 30 includes strut pressure sensors 34, tire pressure sensors 36, a processing device 38 and an output device 40 or other vehicle systems. The strut pressure sensors 34 are mounted to struts of the front, main or other landing gear 24, 26. The tire pressure sensors 36 are mounted to tires of the landing gear 24, 26. Data generated by the tire pressure monitoring sensors 36 and data generated by the strut pressure monitoring sensors 34 are sent to and processed by the processing device 38. The processing device 38 provides an integrated solution that overcomes the problem with strut seal friction. Roughly, a strut pressure only measurement system can achieve a load measurement accuracy that is between about 0.5% of load, and 8.0% of load, depending upon the strut static friction error. Whereas a tire pressure augmented strut pressure measurement system is capable of achieving 0.5% to 1.0% of load over the full operating range. Once the strut pressure measurement has been correlated to the tire pressure measurement (based on achieving the desire strut conditions), it makes little difference whether the adjusted strut pressure or the correlated (adjusted) tire pressure is used to determine the load. However, there will likely be scenarios where either one or the other is preferred.

The processing device 38 gathers data from both the strut pressure sensors 34 and the tire pressures sensors 36 associated with each strut. The sensor readings are temperature compensated/corrected to eliminate/minimize changes associated with changes in temperature. In one embodiment, the temperature corrected readings are continuously processed by a correlation algorithm executed by the processing device 38, thus establishing and updating the relationship between these measurements in real time. In another embodiment, the correlation algorithm includes rate of change monitoring for either or both of the sensors' signals so that changing values can be associated with changing loads. For example, the expected outcome for linearly increasing loads (such as fueling the aircraft 20) would be a linear increase in the tire pressure, but would result in step change increases in the strut pressure reading (due to the static friction). The strut pressure data will lag the actual load until the seal friction is overcome, and then step to, or close to, the pressure associated with the actual load. For the unloading scenario the effect is equivalent, except that the strut pressure indicated load will be higher than the actual load until the seal friction is overcome. The step size is a function of the static friction and the change in the load, and will vary over the life of the strut seal. However, for a given load change (in excess of the static friction value), it will be reasonably constant from one step to the next, and can be measured by comparing the pressure readings associated with each consecutive step. By comparing the magnitude of the pressure step with the magnitude of the change in tire pressure for the same time period (step), a gain correlation is established between the change in strut pressure and the change in tire pressure. In addition, because the tire pressure data always changes in response to changes in loading (i.e., it is not subject to the strut seal static friction), it can be used to determine when the strut piston has moved (overcome the static friction) and therefore when the strut pressure is valid (i.e., an accurate representation of the load). At this moment, the strut pressure is used to calculate an accurate load, and the tire pressure data is synchronized to either the strut pressure or the resulting load. Once these two data sources are synchronized, the tire pressure data is used to continuously update the load until the next strut piston step. Whenever another strut pressure step occurs, the gain correlation and measurement synchronization processes are repeated. This process results in an automatic and continuous re-calibration of the tire pressure measurements as they relate to load, and thereby eliminates or minimizes errors resulting from the numerous error sources associated a tire pressure only load measurement (i.e., variations in standard inflation pressure, foot print size/shape, tire casing characteristics, etc). In addition, by tracking the magnitude of the strut pressure steps, and/or changes in the magnitude of these steps, the health of the strut seal can be evaluated.

The comparison of tire pressure derived weight to the strut pressure derived weight is performed continuously (i.e., every measurement cycle) to determine when/if conditions are right for synchronization of the two measurements (i.e., an "appropriate" predefined pressure step change). This process ensures that data synchronization only occurs when the strut pressure data is most accurate. In addition, the correlation algorithm that associates the gain of the tire pressure measurement with the gain of the strut pressure steps will be automatically updated each time there is valid data indicating an "appropriate" step in the strut pressure. Some level of non-repeatability is normal for precision measurement of this type, which can result in step changes in the correlation coefficients each time they are updated. It is expected that these effects will be small and within the error budget for the system. However, some systems will likely require a smoothing filter (averaging or proportional averaging of newly derived coefficients with their previous values) to minimize data output jitter.

Figure 3:
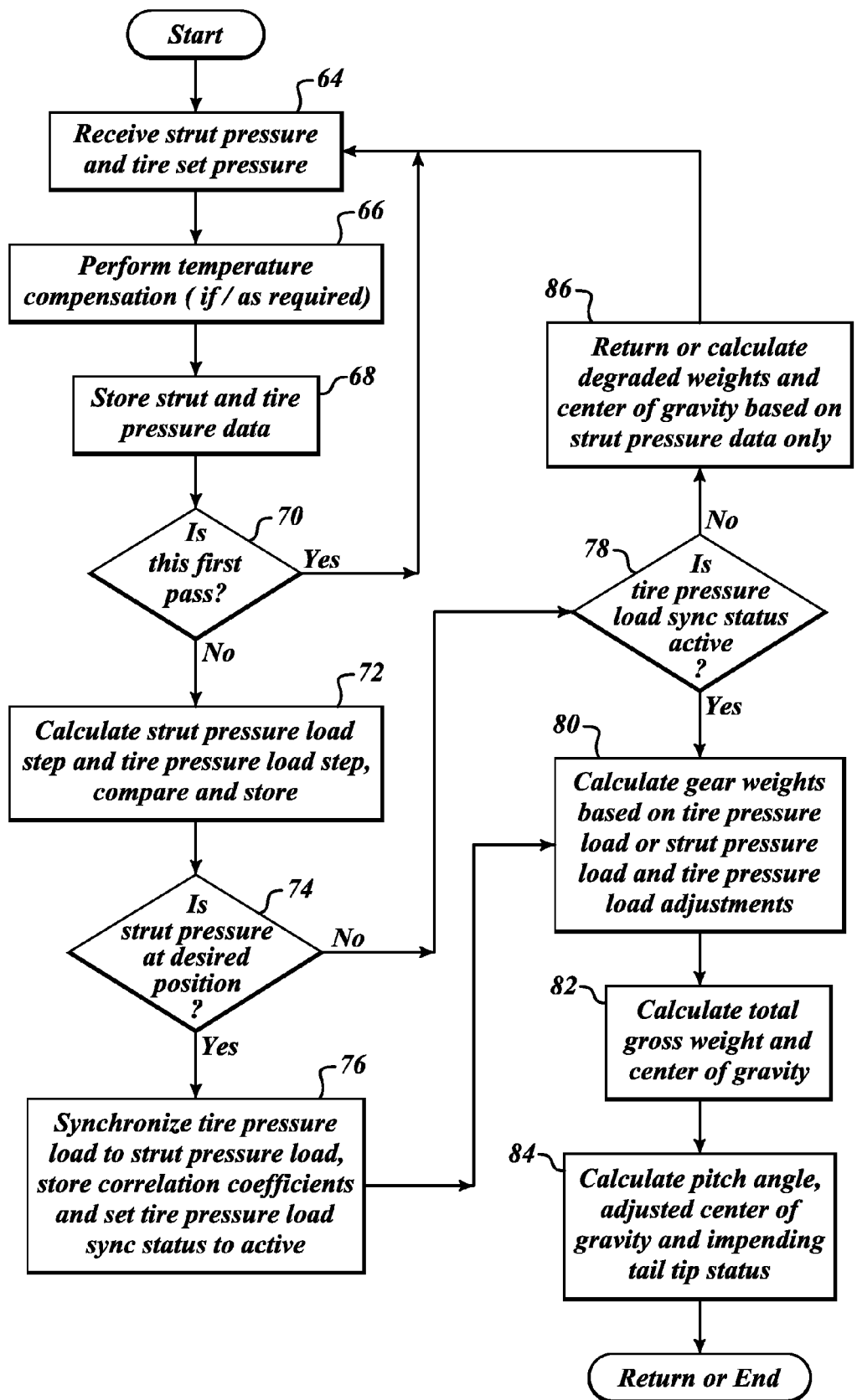
FIG. 3 is a flow diagram showing an example process executed by the WBS shown in FIGS. 1 and 2.

FIG. 3 illustrates an example of processes 60 performed by the WBS 30 of FIG. 2. First, at a block 64, strut pressure information and tire pressure information are received at the processing device 38 from the strut pressure sensors 34 and the tire pressure sensors 36. Then, at a block 66, temperature compensation of the received information is performed based on temperature information from a temperature sensor (optional and not shown). At a block 68, the compensated data is stored to facilitate step change monitoring by comparison to the previous (or next) data sample. At a decision block 70, the process determines if the data set is the first set (i.e., power up initialization), and if so the process will return to block 64 and repeat. On the second pass (blocks 64 through 68), and thereafter, the needed data will be available to calculate step changes for both the tire pressure and the strut pressure data in block 72. This process also compares the two data sets and pass the results to decision block 74 which determines if the strut pressure is at the desired position for synchronization (i.e., the strut load has overcome the static friction and the pressure has stepped an appropriate amount for the specific application). If "Yes", synchronization will occur in block 76, otherwise the process will continue to decision block 78. If the synchronization has already occurred on a previous measurement cycle (since the last power-up initialization), the process will continue at block 80 where the landing gear (strut) weight is calculated. Once the per gear (strut) weights have been calculated the gross weight and center of gravity can be calculated by gear load and gear moment summing. The CG value may also be corrected for aircraft fuselage pitch angle, see blocks 82 and 84. If the Tire Pressure Load to Strut Pressure Load Synchronization has not yet occurred (i.e., Load Sync Status Not Active in block 78), the process at block 86 will return for another process cycle, or optionally, it will proceed with the processes in blocks 80 through 84 but will report the data as "degraded accuracy".

The steps performed in this example process diagram represent one implementation of the invention. It is to be understood that specific applications of the invention may benefit from various alternate processes that are also encompassed by the spirit of this invention, that being the controlled synchronization of strut pressure measurements with tire pressure measurement to obtain continuous accurate load measurements for those conditions where the individual accuracies of these two measurement system might otherwise be indeterminate.

As shown in blocks 72 and 74, the processing device 38 determines if the strut pressure is at a desired position of a pressure step change profile. If the answer is no, then the system will not synchronize or re-synchronize until the condition is met. If the strut pressure is at the desired position of the pressure step change profile, the strut pressure accuracy is deterministic, and at a block 76, tire pressure information is adjusted based on strut pressure information, and correlation coefficients are established and stored. This information is used to calculate gear loads until the next synchronization occurs. And, at a block 80, this information is used to calculate accurate gear loads that are used to calculate accurate gross weight and CG.

An example method for determining the gross weight of a vehicle by determining the weight supported by a landing gear strut and/or struts includes receiving strut pressure data from strut pressure sensors located on landing gear struts of the vehicle, receiving tire pressure data from tire pressure sensors located at tires of the vehicle, and determining the gross weight of the vehicle based on the received strut and tire pressure data. In example embodiments, the determining includes determining if the struts are at a desired condition based on a predefined pressure step change profile, producing at least one of gear strut load data or vehicle gross weight data from some or all of the pressure measurements for the desired condition, and correlating the received tire pressure data with the strut pressure data to determine both the tire pressure and the strut pressure relationship to at least one of the applied load or each other, when it is determined the struts are at the desired condition.

In example embodiments, the correlation relationship derived from the received strut pressure data and tire pressure data is used to produce gear strut load data and vehicle gross weight data when the desired strut conditions do not exist. In example embodiments, temperature compensation of at least one of the strut pressure data or the tire pressure data is performed prior to determining the gear strut load or gross weight. In example embodiments, at least one of the gear strut load data or the individual wheel load data is used to produce one of vehicle longitudinal or lateral center of gravity. In example embodiments, the accuracy of the longitudinal center of gravity is improved by applying a correction based on vehicle pitch angle. In example embodiments, an impending tail tip warning signal is output based on one of the strut pressure data or the tire pressure data.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is: claimed are defined as follows:

1. A method for determining the gross weight of a vehicle, by determining the weight supported by at least one landing gear strut, the method comprising:
   receiving strut pressure data from at least one strut pressure sensor located on at least one landing gear strut of the vehicle;
   receiving tire pressure data from tire pressure sensors located at tires of the vehicle; and
   using a processing device to determine the gross weight of the vehicle based on the received strut pressure data and tire pressure data, wherein the tire pressure data is used to determine when the strut pressure data is accurate.

2. The method of claim 1, wherein determining comprises:
   determining if a pressure step change has occurred in the at least one strut based on a predefined pressure step change profile;
   producing at least one of gear strut load data and vehicle gross weight data from at least one of the strut pressure data and the tire pressure data; and
   when it is determined the pressure step change has occurred, correlating the received tire pressure data with the strut pressure data to determine relationships between tire pressure, strut pressure, and at least one of a gear strut load and the gross weight of the vehicle.

3. The method of claim 2, wherein determining comprises:
   when it is determined the pressure step change has not occurred, using at least one of the relationships to produce at least one of the gear strut load data and the vehicle gross weight data.

4. The method of claim 3, further comprising:
   performing temperature compensation of at least one of the strut pressure data and the tire pressure data prior to determining at least one of the gear strut load data and the vehicle gross weight data.

5. The method of claim 2, further comprising:
   using at least one of the gear strut load data and individual wheel load data to produce at least one of a vehicle longitudinal center of gravity and a vehicle lateral center of gravity.

6. The method of claim 5, wherein accuracy of the longitudinal center of gravity is improved by applying a correction based on vehicle pitch angle.

7. The method of claim 1, further comprising outputting an impending tail tip warning signal based on at least one of the strut pressure data and the tire pressure data.

8. The method of claim 1, further comprising:
   measuring strut pressure using the at least one strut pressure sensor located on the at least one landing gear strut of the vehicle; and
   measuring tire pressure using the tire pressure sensors located at tires of the vehicle.

9. A weight and balance system comprising:
   at least one strut pressure sensor configured to generate strut pressure data for at least one landing gear strut of a vehicle;
   a plurality of tire pressure sensors configured to generate tire pressure data for tires of the vehicle; and
   a processing device in data communication with the strut and tire pressure sensors, the processing device configured to determine at least one of gross weight and center of gravity of the vehicle based on the received strut pressure data and tire pressure data, wherein the tire pressure data is used to determine when the strut pressure data is accurate.

10. The system of claim 9, wherein the processing device is configured to:
    determine if a pressure step change has occurred in the at least one strut based on a predefined pressure step change profile;
    produce at least one of gear strut load data and vehicle gross weight data from at least one of the pressure measurements; and
    correlate the received tire pressure data with the strut pressure data to determine relationships between tire pressure, strut pressure, and at least one of a gear strut load and the gross weight of the vehicle, when it is determined the pressure step change has occurred.

11. The system of claim 10, wherein the processing device is further configured to use at least one of the relationships to produce at least one of the gear strut load data and the vehicle gross weight data when it is determined the pressure step change has not occurred.

12. The system of claim 11, wherein the processing device is further configured to perform temperature compensation of at least one of the strut pressure data and the tire pressure data prior to producing at least one of the gear strut load data and the vehicle gross weight data.

13. The system of claim 9, wherein the processing device is further configured to output an impending tail tip warning signal based on at least one of the strut pressure data and the tire pressure data.

14. A system for determining the gross weight of a vehicle, by determining the weight supported by at least one landing gear strut, the system comprising:
    a means for receiving strut pressure data from at least one strut pressure sensor located on at least one landing gear strut of the vehicle;
    a means for receiving tire pressure data from tire pressure sensors located at tires of the vehicle; and
    a means for determining the gross weight of the vehicle based on the received strut and tire pressure data, wherein the tire pressure data is used to determine when the strut pressure data is accurate.

15. The system of claim 14, wherein the means for determining comprises:
- a means for determining if a pressure step change has occurred in the at least one strut based on a predefined pressure step change profile; and
- a means for producing at least one of gear strut load data and vehicle gross weight data from at least one of the pressure measurements; and
- a means for correlating the received tire pressure data with the strut pressure data to determine relationships between tire pressure, strut pressure, and at least one of gear strut load and the gross weight of the vehicle, when it is determined the pressure step change has occurred.

16. The system of claim 15, wherein the means for determining comprises:
- a means for using at least one of the relationships to produce at least one of the gear strut load data and the vehicle gross weight data when it is determined the pressure step change has not occurred.

17. The system of claim 16, further comprising:
- a means for performing temperature compensation of at least one of the strut pressure data and the tire pressure data prior to determining at least one of the gear strut load data and the vehicle gross weight data.

18. The system of claim 15, further comprising:
- a means for using at least one of the gear strut load data and individual wheel load data to produce at least one of a vehicle longitudinal center of gravity and a vehicle lateral center of gravity.

19. The system of claim 18, wherein accuracy of the longitudinal center of gravity is improved by applying a correction based on vehicle pitch angle.

20. The system of claim 14, further comprising:
- a means for outputting an impending tail tip warning signal based on at least one of the strut pressure data and the tire pressure data.

* * * * *